United States Patent
Kancharla et al.

(10) Patent No.: US 10,338,964 B1
(45) Date of Patent: Jul. 2, 2019

(54) COMPUTING NODE JOB ASSIGNMENT FOR DISTRIBUTION OF SCHEDULING OPERATIONS

(71) Applicant: Capital One Services, LLC, McLean, VA (US)

(72) Inventors: Gopi Kancharla, Frisco, TX (US); David Gillam, The Colony, TX (US); Chris Sering, Van Alstyne, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/249,621

(22) Filed: Jan. 16, 2019

(51) Int. Cl.
*G06F 9/48* (2006.01)
*G06F 9/50* (2006.01)
*G06F 9/54* (2006.01)

(52) U.S. Cl.
CPC .......... *G06F 9/4881* (2013.01); *G06F 9/4887* (2013.01); *G06F 9/5083* (2013.01); *G06F 9/54* (2013.01)

(58) Field of Classification Search
CPC .... G06F 9/4881; G06F 9/4887; G06F 9/5083; G06F 9/54
See application file for complete search history.

(56) References Cited

U.S. PATENT DOCUMENTS

| | | | |
|---|---|---|---|
| 6,763,519 B1 | 7/2004 | McColl et al. | |
| 7,287,180 B1 | 10/2007 | Chen et al. | |
| 7,613,848 B2 | 11/2009 | Amini et al. | |
| 8,194,690 B1 | 6/2012 | Steele et al. | |
| 8,230,110 B2 | 7/2012 | Vegesna et al. | |
| 9,047,246 B1* | 6/2015 | Rahut | G06F 11/1425 |
| 2001/0000194 A1* | 4/2001 | Sequeira | G06F 9/4881 725/39 |
| 2006/0067227 A1* | 3/2006 | Batni | H04L 41/00 370/235 |
| 2007/0211280 A1 | 9/2007 | Bansel et al. | |
| 2007/0299980 A1 | 12/2007 | Amini et al. | |
| 2008/0253283 A1 | 10/2008 | Douglis et al. | |
| 2008/0256384 A1 | 10/2008 | Branson et al. | |
| 2013/0179881 A1* | 7/2013 | Calder | G06F 9/5072 718/1 |
| 2015/0237132 A1* | 8/2015 | Antony | H04L 67/1095 709/224 |
| 2016/0371110 A1* | 12/2016 | Radhakrishnan | G06F 9/45558 |
| 2017/0366407 A1* | 12/2017 | Spivak | H04L 41/12 |

* cited by examiner

*Primary Examiner* — Benjamin C Wu
(74) *Attorney, Agent, or Firm* — Harrity & Harrity, LLP

(57) ABSTRACT

A computing node may receive, from a set of computing nodes including the computing node, a corresponding set of heartbeat messages related to selecting a scheduler computing node for scheduling one or more jobs for the set of computing nodes. The computing node may determine, based on the set of heartbeat messages, whether the computing node is to be selected as the scheduler computing node based on: whether the computing node has been selected as the scheduler computing node a fewest number of times as compared to other computing nodes included in the set of computing nodes, and whether the scheduler is being executed by any computing node included in the set of computing nodes. The computing node may selectively schedule the one or more jobs for the set of computing nodes based on determining whether the computing node is to be selected as the scheduler computing node.

20 Claims, 7 Drawing Sheets

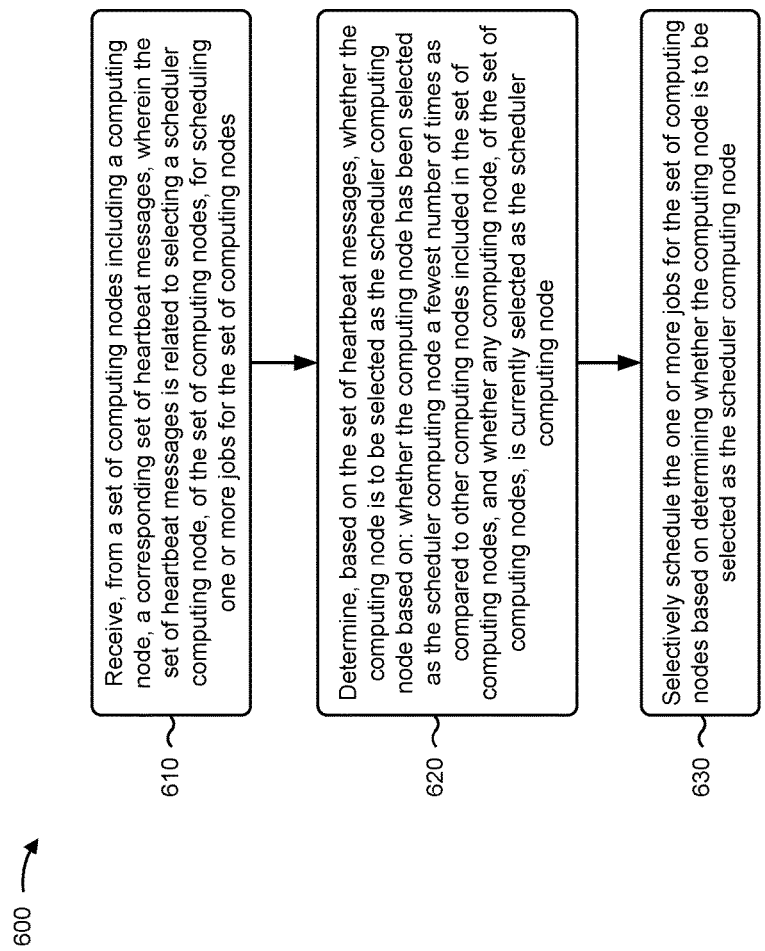

COMPUTING NODE JOB ASSIGNMENT FOR DISTRIBUTION OF SCHEDULING OPERATIONS

BACKGROUND

A micro-service architecture is a variant of the service-oriented architecture that structures an application as a collection of related services. A micro-service architecture may utilize a modular structure for easier development and/or testing. Services in a micro-service architecture may communicate with one another to fulfill a goal and/or to produce an output from a system.

SUMMARY

According to some implementations, a method may include receiving, by a computing node included in a set of computing nodes, a corresponding set of heartbeat messages that originated at the set of computing nodes, wherein the set of heartbeat messages is related to selecting a scheduler computing node, of the set of computing nodes, for scheduling a set of jobs associated with the set of computing nodes, wherein each heartbeat message indicates, for a corresponding computing node of the set of computing nodes: a number of times that the corresponding computing node has been selected as the scheduler computing node, and whether the corresponding computing node is currently executing a scheduler to schedule one or more jobs for the set of computing nodes; determining, by the computing node and based on the set of heartbeat messages, that the computing node has been selected as the scheduler computing node the fewest number of times as compared to other computing nodes included in the set of computing nodes; determining, by the computing node and based on the set of heartbeat messages, that the scheduler is not being executed by any computing node included in the set of computing nodes; and selecting, by the computing node, the computing node as the scheduler computing node based on determining that the computing node has been selected as the scheduler computing node the fewest number of times and that the scheduler is not being executed by any computing node included in the set of computing nodes.

According to some implementations, a computing node may include one or more memories and one or more processors, communicatively coupled to the one or more memories, configured to receive, from a set of computing nodes including the computing node, a corresponding set of heartbeat messages, wherein the set of heartbeat messages is related to selecting a scheduler computing node, of the set of computing nodes, for scheduling one or more jobs for the set of computing nodes, wherein each heartbeat message indicates, for a corresponding computing node of the set of computing nodes: a number of times that the corresponding computing node has been selected as the scheduler computing node, and whether the corresponding computing node is currently executing a scheduler for the set of computing nodes; determine, based on the set of heartbeat messages, whether the computing node is to be selected as the scheduler computing node based on: whether the computing node has been selected as the scheduler computing node a fewest number of times as compared to other computing nodes included in the set of computing nodes, and whether the scheduler is being executed by any computing node included in the set of computing nodes; and selectively schedule the one or more jobs for the set of computing nodes based on determining whether the computing node is to be selected as the scheduler computing node.

According to some implementations, a non-transitory computer-readable medium may store one or more instructions that, when executed by one or more processors, cause the one or more processors to receive, from a set of computing nodes including the computing node, a corresponding set of heartbeat messages, wherein the set of heartbeat messages is related to selecting a scheduler computing node, of the set of computing nodes, for scheduling one or more jobs for the set of computing nodes, wherein each heartbeat message indicates, for a corresponding computing node of the set of computing nodes: a unique identifier that distinguishes the corresponding computing node from all other computing nodes included in the set of computing nodes, a number of times that the corresponding computing node has been selected as the scheduler computing node, and whether the corresponding computing node is currently selected as the scheduler computing node; determine, based on the set of heartbeat messages, whether the computing node is to be selected as the scheduler computing node based on: whether the computing node has been selected as the scheduler computing node a fewest number of times as compared to other computing nodes included in the set of computing nodes, and whether any computing node, of the set of computing nodes, is currently selected as the scheduler computing node; and selectively schedule the one or more jobs for the set of computing nodes based on determining whether the computing node is to be selected as the scheduler computing node.

BRIEF DESCRIPTION OF THE DRAWINGS

FIGS. 4-6 are flow charts of an example process relating to computing node job assignment for distribution of scheduling operations.

DETAILED DESCRIPTION

Figure 1A:
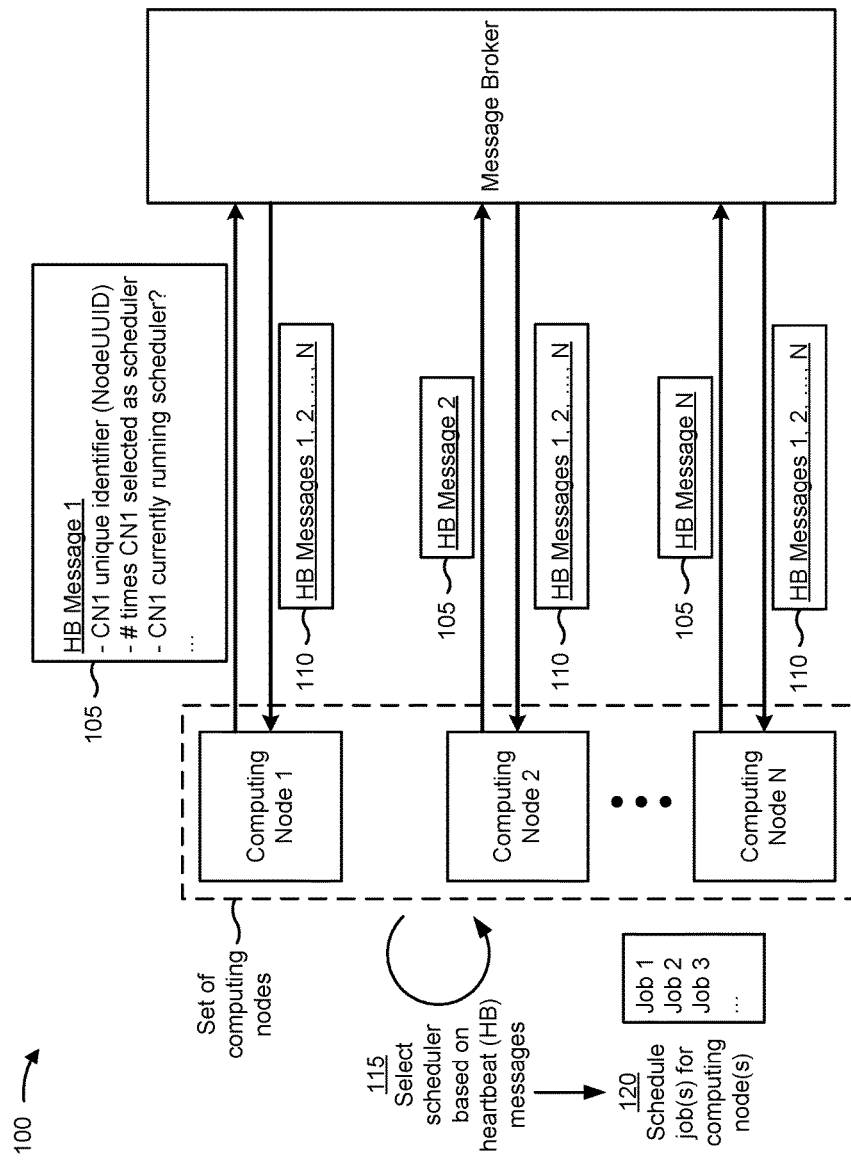
FIGS. 1A-1B are diagrams of an example implementation described herein.

The following detailed description of example implementations refers to the accompanying drawings. The same reference numbers in different drawings may identify the same or similar elements.

Various micro-services may be coordinated within an application to generate an output. For example, various micro-services may be associated with an application for processing a loan request, and the micro-services may be coordinated to determine whether the loan request is accepted, is rejected, is escalated to an individual for further review, and/or the like. In a micro-services architecture, a set of computing nodes (e.g., containerized application instances, server devices, user devices, and/or the like, which may be distributed across different geographic regions) may process jobs related to the micro-services to generate output for the micro-services. If multiple computing nodes perform the same job to generate the same output, this wastes significant computing resources of the computing nodes, wastes network resources (e.g., bandwidth) of a network that is used to provide the output to a destination device, delays processing of other jobs, and/or the like.

To ensure that multiple computing nodes do not process the same job, and to make sure that all jobs are processed, some implementations described herein select a single computing node as a scheduler (e.g., a scheduler computing node) to schedule the jobs for the set of computing nodes for a particular scheduling instance. The scheduler computing node may schedule new jobs and/or failed jobs (e.g., jobs that were previously scheduled but that experienced a failure due to, for example, a failure in a communication link of the micro-services architecture, a failure in processing a job, and/or the like) by instructing one or more computing nodes, in the set of computing nodes, to process one or more of the jobs. Furthermore, some implementations described herein may ensure that only a single computing node is selected as the scheduler computing node at any particular time, thereby preventing the assignment of the same job to multiple computing nodes and reducing the likelihood of missing a job.

Furthermore, some implementations described herein use a decentralized scheduling architecture, where scheduling is performed by different computing nodes for different scheduling instances (e.g., at different points in time), rather than using one or a limited number of computing nodes for scheduling. In this way, scheduling may continue to be performed even if a computing node failure occurs (e.g., if communications with a computing node fail, if the computing node fails, and/or the like). Furthermore, some implementations described herein distribute scheduling responsibilities evenly across the set of computing nodes by selecting a different computing node as the scheduler computing node for different scheduling instances. This may prevent individual computing nodes from becoming overloaded with performing scheduling (e.g., which may be resource-intensive), may increase availability of those computing nodes for processing jobs, may improve functioning of individual computing nodes by preventing such overloading, and/or the like.

The technique used to select a scheduler computing node may be standardized and/or synchronized across computing nodes, ensuring that only a single computing node is selected as the scheduler, thereby ensuring that multiple computing nodes do not process the same job (e.g., due to scheduling of the same job by multiple computing nodes), thereby conserving computing resources (e.g., memory resources, processing resources, power, and/or the like). Furthermore, these techniques facilitate quick and efficient assignment of jobs among computing nodes, thereby improving functioning of the computing nodes by using less network throughput.

Furthermore, when the computing nodes are distributed across multiple geographic regions, some techniques described herein may be used to communicate with the computing nodes in different geographic regions to ensure that no job is duplicated across the geographic regions (e.g., on computing nodes in different geographic regions). For example, a message broker described herein may permit a multi-cluster deployment of computing nodes (e.g., in disparate geographic regions) while ensuring that jobs are not duplicated across those regions.

Figure 1B:
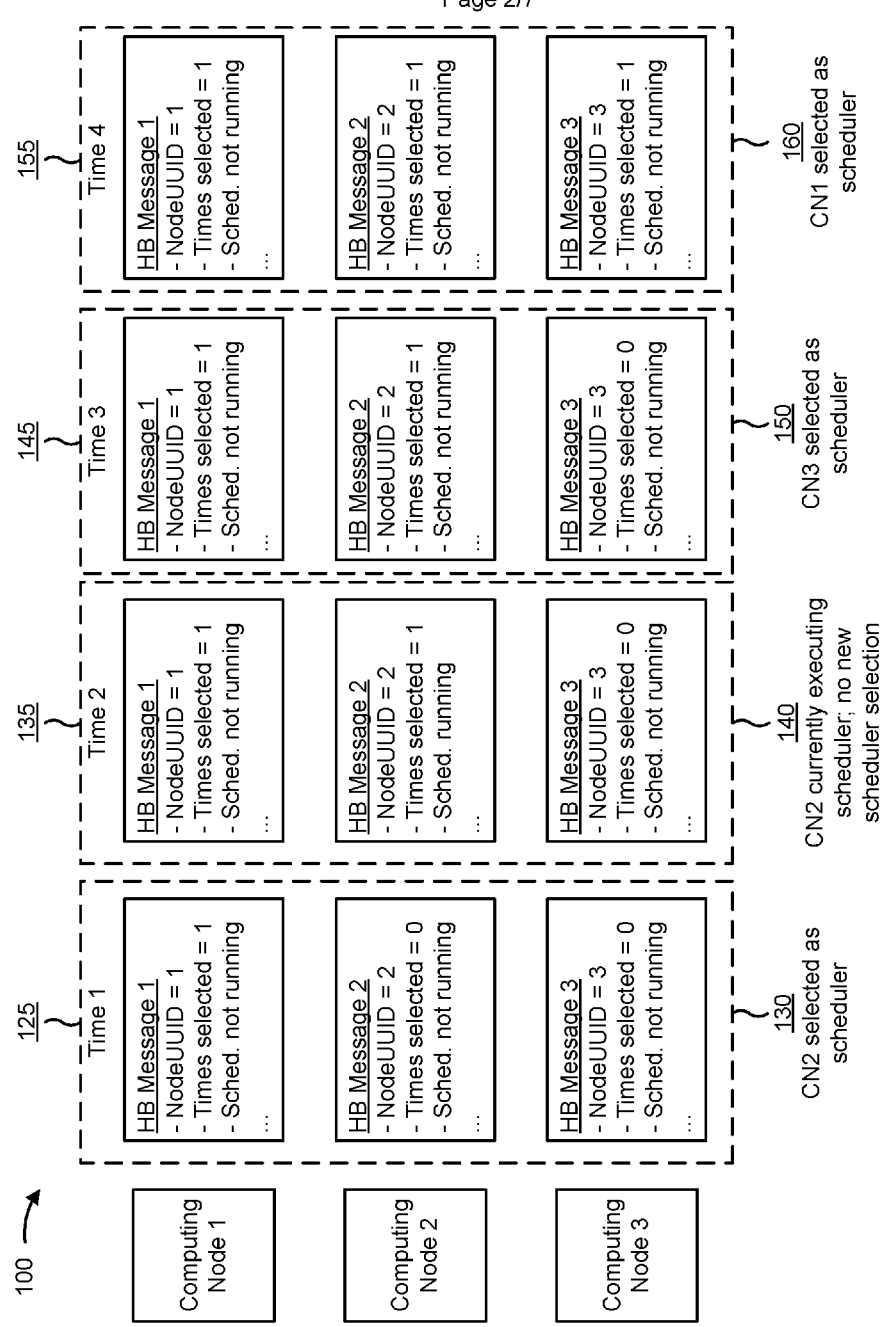

FIGS. 1A-1B are diagrams of an example implementation 100 described herein. As shown in FIG. 1, implementation 100 includes a message broker (e.g., Kafka® and/or a message broker that interfaces with Kafka®) and a set of computing nodes 1 though N (e.g., where N is greater than or equal to 2), one of which may be selected as a scheduler (e.g., sometimes referred to herein as a scheduler computing node) for a particular scheduling instance. In some implementations, the set of computing nodes may be grouped into a computing cluster (e.g., a set of computing nodes associated with the same application, associated with related micro-services, and/or the like). In some implementations, the scheduler may be implemented on the computing nodes. In some implementations, the message broker may be implemented as a separate application, device, and/or the like. Alternatively, the message broker may be implemented on the computing nodes. In some implementations, the computing nodes may be configured to perform various jobs related to a set of micro-services. A job may include one or more computing instructions (e.g., code and/or the like), and may be performed and/or processed by executing those computing instructions.

As shown by reference numbers 105, the computing nodes may transmit heartbeat (HB) messages to the message broker. For example, the computing nodes may be subscribed to a message stream of the message broker, associated with the heartbeat messages, and may each publish respective heartbeat messages to the message stream. All of the computing nodes may receive the respective heartbeat messages based on being subscribed to the message stream.

In some implementations, a heartbeat message may include information relating to selecting a scheduler computing node. For example, a heartbeat message may include information that identifies the computing node from which the heartbeat message originated, such as by including a computing node identifier, a unique identifier (e.g., a universal unique identifier (UUID), sometimes referred to as Node UUID or NodeUUID for a computing node) that distinguishes a computing node from all other computing nodes in the set of computing nodes, a network address, and/or the like. Additionally, or alternatively, a heartbeat message may include information that identifies a number of times that a computing node, from which the heartbeat message originated, has been selected as the scheduler computing node. As described in more detail elsewhere herein, this information may be used to select a scheduler computing node for a scheduling instance such that a particular computing node is not overloaded with scheduling jobs. Additionally, or alternatively, a heartbeat message may include information that indicates whether a computing node, from which the heartbeat message originated, is currently executing a scheduler to schedule one or more jobs for the set of computing nodes (e.g., whether the computing node is currently selected as and/or acting as the scheduler computing node). As described in more detail elsewhere herein, this information may be used to prevent multiple computing nodes from executing a scheduler at the same time.

Additionally, or alternatively, a heartbeat message may include other information related to a computing node, information relating to processing of a job by the computing node, and/or the like. For example, a heartbeat message, originated by a computing node, may include information that identifies an application hosted on the computing node, a version of software installed on the computing node (e.g., a version of a scheduler), a status of the computing node (e.g., actively processing a job, idle, and/or the like), an amount of computing resources of the computing node being consumed by processing a job, and/or the like.

In some implementations, the computing nodes may be configured with respective clocks that are synchronized to the same time (or within a threshold amount of time of each other). In some implementations, based on a time indicated by the respective clocks, the computing nodes may transmit the heartbeat messages according to a periodicity, at a set of pre-determined times, and/or the like. For example, the computing nodes may publish respective heartbeat messages to a message stream associated with the message broker every 20 seconds, every 30 seconds, every minute, ten times per hour, and/or the like.

As shown by reference number 110, each computing node, included in the set of computing nodes, may receive heartbeat messages from every computing node included in the set of computing nodes. For example, the message broker may receive heartbeat messages from each computing node, and may transmit all of those heartbeat messages to all of the computing nodes. Thus, a specific computing node may receive the heartbeat message transmitted by that computing node, as well as the heartbeat messages transmitted by every other computing node included in the set of computing nodes.

As shown by reference number 115, each computing node may analyze the set of received heartbeat messages to determine whether that computing node should be selected as the scheduler (e.g., as a scheduling computing node that executes a scheduler). In some implementations, a computing node may determine whether to select itself as the scheduler based on the information included in the heartbeat messages. Each computing node may make this determination for itself (e.g., whether to select itself as the scheduler) using the same determination process as the other computing nodes, such that only a single computing node is selected as the scheduler for a particular scheduling instance (e.g., corresponding to a set of heartbeat messages received together). As described in more detail below in connection with FIG. 1B, this determination may be based on the number of times that each computing node has been selected as the scheduler, whether the scheduler is currently being executed by another computing node (e.g., as indicated in a heartbeat message generated by that computing node), unique identifiers of the computing nodes, and/or the like.

In general, the computing node that has been selected as the scheduler the fewest number of times, as compared to the other computing nodes, may be selected as the scheduler for a scheduling instance. If multiple computing nodes have been selected as the scheduler the fewest number of times, then the unique identifiers of those computing nodes may be used to select the scheduler (e.g., the computing node with the lowest unique identifier, with the highest unique identifier, and/or the like). Additionally, or alternatively, if the scheduler is currently being executed by a computing node, then the computing nodes may refrain from selecting a different computing node as the scheduler until the scheduler finishes execution. Additional details are provided below in connection with FIG. 1B.

As shown by reference number 120, the computing node that has been selected as the scheduler may schedule one or more jobs for the computing nodes. Such scheduling may include scheduling one or more jobs for one or more other computing nodes (e.g., other than the scheduler computing node), and/or may include scheduling one or more jobs for the scheduler computing node. In some implementations, two or more of the computing nodes may be located in different geographic regions (e.g., in different clusters of computing nodes), and may transmit heartbeat messages to a corresponding local message broker (e.g., associated with a cluster) at different periodicities and/or times (e.g., different intervals between transmissions, different times of transmission, and/or the like). The message broker (e.g., a global message broker that interfaces with all clusters) may receive heartbeat messages from the computing nodes in the different geographic regions (e.g., via local message brokers, in some implementations), and may transmit those heartbeat messages to all computing nodes in all geographic regions with a specific periodicity, which may be distinct form the periodicities used locally. In this way, the scheduling is not dependent upon local message periodicities, and can ensure that no job is duplicated on computing nodes in different geographic regions.

In some implementations, the computing nodes may transmit the heartbeat messages according to a periodicity that indicates multiple instances of time at which the computing nodes are to transmit the heartbeat messages. In some implementations, each instance of time corresponds to a scheduling instance in which the computing nodes are to perform the determination and/or selection process described herein to determine whether any computing nodes are to be selected as the scheduler and/or to select a computing node as the scheduler. A computing node that has been selected as the scheduler based on analyzing a first set of heartbeat messages may update the information to be transmitted in a next heartbeat message to be transmitted by that computing node. For example, the computing node may update the number of times that the computing node has been selected as the scheduler (e.g., by incrementing a counter value), may indicate whether the scheduler is executing on the computing node at a time when the heartbeat message is generated, and/or the like. This updated information may then be used for a subsequent scheduling instance corresponding to a second set of heartbeat messages transmitted by the computing nodes. An example is described below in connection with FIG. 1B.

As shown in FIG. 1B, the set of computing nodes may include three computing nodes as an example. As shown by reference number 125, the three computing nodes may each transmit a heartbeat message to the message broker at a first time (shown as Time 1), and may receive all heartbeat messages from the message broker. At the first time, a first heartbeat message (shown as HB Message 1) from the first computing node (shown as Computing Node 1) indicates a universal unique identifier (Node UUID) of 1 for the first computing node, indicates that the first computing node has already been selected as the scheduler once, and indicates that the scheduler is not currently executing on the first computing node. A second heartbeat message (shown as HB Message 2) from the second computing node (shown as Computing Node 2) indicates a Node UUID of 2 for the second computing node, indicates that the second computing node has never been selected as the scheduler (i.e., has been selected zero times), and indicates that the scheduler is not currently executing on the second computing node. A third heartbeat message (shown as HB Message 3) from the third computing node (shown as Computing Node 3) indicates a Node UUID of 3 for the third computing node, indicates that the third computing node has never been selected as the scheduler (e.g., has been selected zero times), and indicates that the scheduler is not currently executing on the third computing node.

As shown by reference number 130, based on these heartbeat messages, the second computing node may select itself as the scheduler. For example, to assist with even distribution of scheduling overhead across the set of computing nodes, the computing node that has been selected as the scheduler the fewest number of times as of a scheduling instance (e.g., corresponding to Time 1) may be selected as the scheduler for that scheduling instance. In example 100, the second and third computing nodes have both been selected as the scheduler zero times, and thus are tied for the fewest number of times of selection as the scheduler. When this occurs, other information in the heartbeat messages may be used to determine which computing node is to be selected as the scheduler. For example, the computing node with an identifier that satisfies a condition may be selected as the scheduler. In example 100, the condition is that the identifier has a smallest value as compared to identifiers of the other computing nodes that are tied for the fewest number of selections. Thus, the second computing node is selected instead of the third computing node because the Node UUID of the second computing node has a value (e.g., 2) is less than the value of the Node UUID of the third computing node (e.g., 3).

In some implementations, other conditions may be used to determine which computing node is to be selected as the scheduler. For example, the condition may be that the identifier has a largest value as compared to identifiers of the other computing nodes that are tied for the fewest number of selections. In this case, and in this example, the third computing node would be selected as the scheduler instead of the second computing node. Additionally, or alternatively, information other than the identifier, which may be indicated in a heartbeat message, may be used to select a computing node when there are multiple computing nodes tied for the fewest number of selections. For example, the computing nodes may be configured to select a computing node based on a transmission delay of heartbeat messages for those computing nodes (e.g., a time between when the heartbeat message was supposed to have been transmitted, according to the periodicity, and when the heartbeat message was actually transmitted), such as to select a computing node with the least delay (e.g., for fastest scheduling). Additionally, or alternatively, the computing nodes may be configured to select a computing node based on a version of the computing node (e.g. a version of a container image), a version of software (e.g., the scheduler, scheduling software, and/or the like) executing on those computing nodes (e.g., to select a computing node with the latest version of software). For example, each heartbeat message may include an identifier associated with the application instance, which may be indicative of a version of the application instance (e.g., a version of a container image) associated with the corresponding computing node that generates the heartbeat message. In some implementations, if different versions of the computing node are executing within the set of computing nodes, then only a computing node with the newest version of the application instance may be selected as the scheduling computing node.

As shown by reference number 135, the three computing nodes may each transmit a heartbeat message to the message broker at a second time (shown as Time 2), and may receive all heartbeat messages from the message broker. At the second time, a first heartbeat message from the first computing node indicates a Node UUID of 1 for the first computing node, indicates that the first computing node has already been selected as the scheduler once, and indicates that the scheduler is not currently executing on the first computing node. Because the first computing node was not selected as the scheduler in association with Time 1, the heartbeat message for the first computing node is the same at Time 1 and Time 2. A second heartbeat message from the second computing node indicates a Node UUID of 2 for the second computing node, indicates that the second computing node has been selected as the scheduler once, and indicates that the scheduler is executing on the second computing node. In this case, due to the second computing node being selected as the scheduler in association with Time 1, the second computing node has incremented a counter value that indicates the number of times that the second computing node has been selected as the scheduler, and has transmitted an updated number in the heartbeat message associated with Time 2. Furthermore, in this case, the length of time required to schedule the jobs is longer than a periodicity associated with the heartbeat messages, so the second computing node indicates, in the heartbeat message, that the second computing node is still executing the scheduler. A third heartbeat message from the third computing node at Time 2 indicates the same information as at Time 1 due to the third computing node not being selected as the scheduler.

As shown by reference number 140, because the second computing node is still executing the scheduler for the scheduling instance associated with Time 2, no other computing node is permitted to be selected as the scheduler for this scheduling instance. In this case, the second computing node continues to run the scheduler until scheduling is complete (e.g., until all jobs in a queue of jobs have been scheduled and/or assigned to computing nodes), and then indicates that the second computing node is not executing the scheduler in a next heartbeat message following completion of scheduling.

As shown by reference number 145, the three computing nodes may each transmit a heartbeat message to the message broker at a third time (shown as Time 3), and may receive all heartbeat messages from the message broker. At the third time, a first heartbeat message from the first computing node at Time 3 indicates the same information as at Time 1 and Time 2 due to the first computing node not being selected as the scheduler for the scheduling instances associated with Time 1 and Time 2. A second heartbeat message from the second computing node indicates that the second computing node has been selected as the scheduler once, and indicates that the scheduler is not executing on the second computing node. In this case, when the scheduler is executing when a heartbeat message is generated, and the second computing node indicates that the scheduler is executing, the second computing node does not increment a counter value indicated a number of times that the second computing node was selected as the scheduler (e.g., because the scheduler was still executing, and no other computing nodes were selected as the scheduler). However, in some cases, when the scheduler is executing when a heartbeat message is generated, then the second computing node may increment the counter value, which may lead to more balanced distribution of scheduling overhead between the computing nodes (e.g., because scheduling operations that take longer to perform are weighted more heavily). A third heartbeat message from the third computing node at Time 3 indicates the same information as at Time 1 and Time 2 due to the third computing node not being selected as the scheduler.

As shown by reference number 150, based on the heartbeat messages received in association with Time 3, the third computing node may select itself as the scheduler. For example, to assist with even distribution of scheduling overhead across the set of computing nodes, the computing node that has been selected as the scheduler the fewest number of times as of a scheduling instance (e.g., corresponding to Time 3) may be selected as the scheduler for that scheduling instance. In example 100, the third computing node has been selected as the scheduler zero times, and the first and second computing nodes have been selected as the scheduler one time each. Thus, the third computing node may select itself as the scheduler. During this scheduling instance, the first computing node may determine not to select itself as the scheduler because the first computing node has not been selected as the scheduler the fewest number of times. Similarly, the second computing node may determine not to select itself as the scheduler because the second computing node has not been selected as the scheduler the fewest number of times. Thus, the third computing node may select itself as the scheduler and schedule one or more jobs for one or more computing nodes included in the set of computing nodes, and the first and second computing nodes may refrain from scheduling one or more jobs for one or more computing nodes included in the set of computing nodes.

As shown by reference number 155, the three computing nodes may each transmit a heartbeat message to the message broker at a fourth time (shown as Time 4), and may receive all heartbeat messages from the message broker. At the fourth time, a first heartbeat message from the first computing node at Time 4 indicates the same information as at Time 1, Time 2, and Time 3 due to the first computing node not being selected as the scheduler for the scheduling instances associated with Time 1, Time 2, or Time 3. Similarly, a second heartbeat message from the second computing node indicates the same information as at Time 3 because the second computing node was not selected as the scheduler for the scheduling instance associated with Time 3. A third heartbeat message from the third computing node indicates that the third computing node has been selected as the scheduler once, and indicates that the scheduler is not executing on the third computing node. In this case, the length of time required to schedule the jobs is shorter than a periodicity associated with the heartbeat messages, so the third computing node indicates, in the third heartbeat message, that the third computing node is not executing the scheduler.

As shown by reference number 160, based on the heartbeat messages received in association with Time 4, the first computing node may select itself as the scheduler. For example, to assist with even distribution of scheduling overhead across the set of computing nodes, the computing node that has been selected as the scheduler the fewest number of times as of a scheduling instance (e.g., corresponding to Time 4) may be selected as the scheduler for that scheduling instance. In example 100, all three computing nodes have been selected as the scheduler one time in association with Time 4. In example 100, the tiebreaker condition indicates that the computing node with the smallest identifier value, as compared to the other computing nodes tied for the fewest number of selections, is to be selected as the scheduler. In this case, the first computing node (e.g., with a Node UUID of 1) is selected as the scheduler instead of the second computing node (e.g., with a Node UUID of 2) or the third computing node (e.g., with a Node UUID of 3).

In some implementations, when performing a determination process to determine whether a computing node should select itself as the scheduler, the computing node may determine whether any computing node is executing the scheduler before determining whether the computing node has been selected the fewest number of times. In this way, computing resources may be conserved that would otherwise be wasted by first determining whether the computing node has been selected the fewest number of times, and then determining that another computing node is currently executing the scheduler (e.g., resulting in no selection of a different computing node as the scheduler).

In some implementations, when performing a determination process to determine whether a computing node should select itself as the scheduler, the computing node may generate a sorted list of unique identifiers included in a set of heartbeat messages received from a corresponding set of computing nodes (e.g., including the computing node generating the list). The list may be sorted according to the number of times that each computing node, in the set of computing nodes, has been selected as the scheduler computing node. If there is a tie between multiple computing nodes regarding the number of times those computing nodes have been selected as the scheduler computing node, then the list may be further sorted according to a unique identifier (or another value to distinguish between the tied computing nodes, as described above). The computing node may use the sorted list to determine whether to select itself as the scheduler. In some implementations, a unique identifier may be included in the list and/or the sorted list only if a computing node, identified by the unique identifier, has a latest version of software (e.g., a scheduler, an application instance, and/or other software) installed. In this case, a version associated with a unique identifier may be compared to all other versions in the heartbeat messages, and may be added to the list only if the version is greater than or equal to all other versions.

In some implementations, a computing node may store information included in a received set of heartbeat messages in memory. In some implementations, the computing node may delete the information after determining whether the computing node is to be selected as the scheduler. This may free up memory to store subsequently received heartbeat messages. In this way, memory resources of the computing nodes may be conserved.

By selecting a computing node as a scheduler using the techniques described herein, the selection may be limited to a single computing node at any particular time, thereby preventing the assignment of the same job to multiple computing nodes and reducing the likelihood of missing a job. Furthermore, scheduling may be performed by different computing nodes for different scheduling instances, thereby ensuring that scheduling continues to be performed even if a computing node failure occurs. Furthermore, by distributing scheduling responsibilities evenly across the set of computing nodes, individual computing nodes may be less likely to become overloaded with performing scheduling (e.g., which may be resource-intensive), may have improved functioning due to preventing such overloading, may have increased availability for processing jobs, and/or the like.

As indicated above, FIGS. 1A and 1B are provided as an example. Other examples may differ from what is described with regard to FIGS. 1A and 1B.

Figure 2:
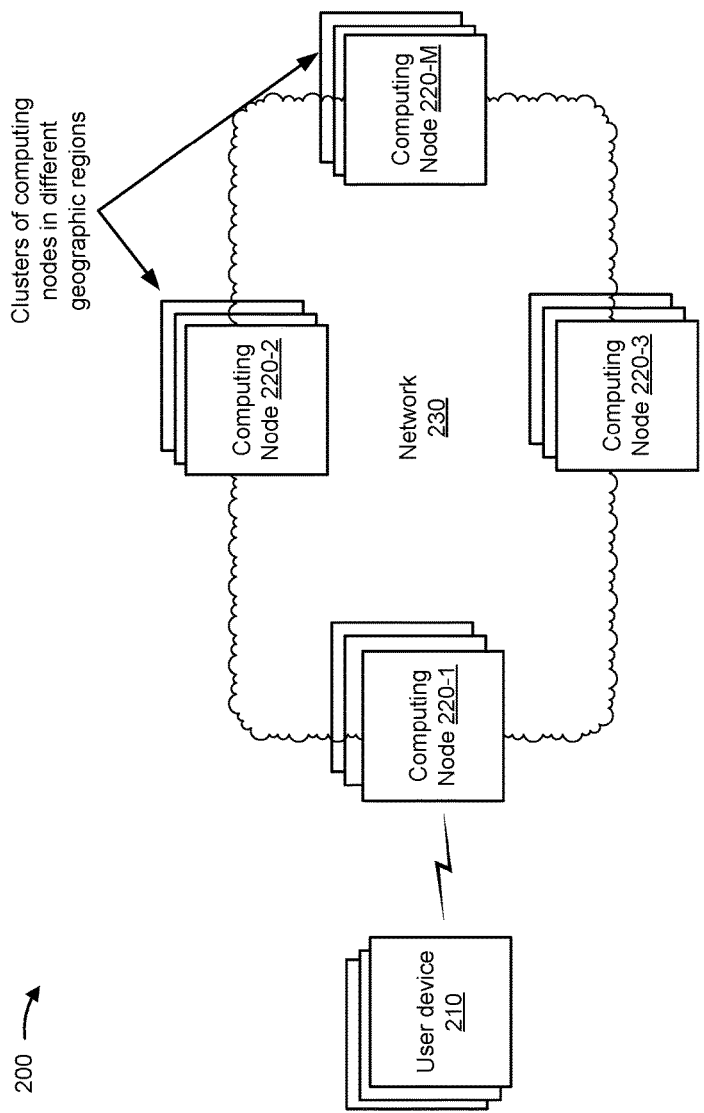
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a set of user devices 210 (referred to collectively as "user devices 210" and individually as "user device 210"), computing nodes 220-1 through 220-M (M≥2) (referred to collectively as "computing nodes 220" and individually as "computing node 220"), and a network 230. Devices of environment 200 may interconnect via wired connections, wireless connections, or a combination of wired and wireless connections.

User device 210 includes one or more devices capable of receiving, generating, storing, processing, and/or providing information associated with assigning a set of jobs, related to a set of micro-services, among computing nodes 220. For example, user device 210 may include a desktop computer, a mobile phone (e.g., a smart phone, a radiotelephone, and/or the like), a laptop computer, a tablet computer, a handheld computer, a gaming device, a virtual reality device, a wearable communication device (e.g., a smart wristwatch, a pair of smart eyeglasses, and/or the like), a server, or a similar type of device. In some implementations, user device 210 may receive, and output for display, information related to assignment of a set of jobs among computing nodes 220.

Computing node 220 includes one or more devices capable of receiving, generating, storing, processing, and/or providing information related to assignment of a set of jobs to computing nodes 220. For example, computing node 220 may include one or more personal computers, workstation computers, server devices, or another type of computation and/or communication device. In some implementations, computing node 220 may be a physical device implemented within a housing, such as a chassis. In some implementations, computing node 220 may be a virtual device implemented by one or more computer devices of a cloud computing environment or a data center. In some implementations, computing node 220 may be associated with an application and/or a micro-service. Additionally, or alternatively, computing node 220 may determine a manner in which to assign a set of jobs, related to a micro-service, to one or more computing nodes 220, as described elsewhere herein.

In some implementations, computing node 220 may include a scheduler. For example, the scheduler may determine a prioritization of a set of computing nodes 220 and/or may assign jobs to the set of computing nodes 220, as described elsewhere herein. Additionally, or alternatively, computing node 220 may include a message broker. For example, the message broker may facilitate communications between computing node 220 and one or more other computing nodes 220, as described elsewhere herein. In some implementations, the scheduler and/or the message broker may be separate devices from computing node 220 (e.g., separate physical devices or separate virtual devices).

In some implementations, different computing nodes 220 may be located in different geographic regions (e.g., in different clusters of computing nodes). Additionally, or alternatively, a computing node 220 may correspond to a container, and each container may execute an application instance within a cluster of containers (e.g., a cluster of computing nodes 220). Some techniques described herein assist with scheduling such that only one application instance, out of all of the geographically distributed application instances, is executing a scheduler and/or a job at any given time.

Network 230 includes one or more wired and/or wireless networks. For example, network 230 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
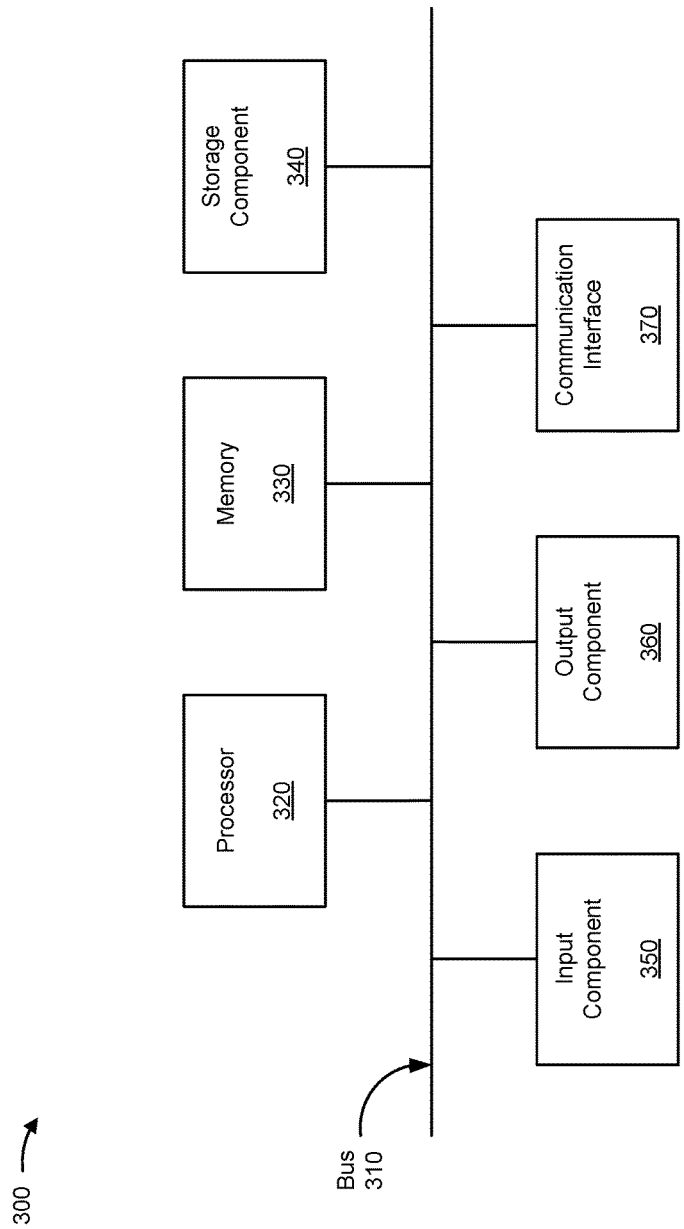
FIG. 3 is a diagram of example components of one or more devices of FIG. 2.

FIG. 3 is a diagram of example components of a device 300. Device 300 may correspond to user device 210 and/or computing node 220. In some implementations, user device 210 and/or computing node 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
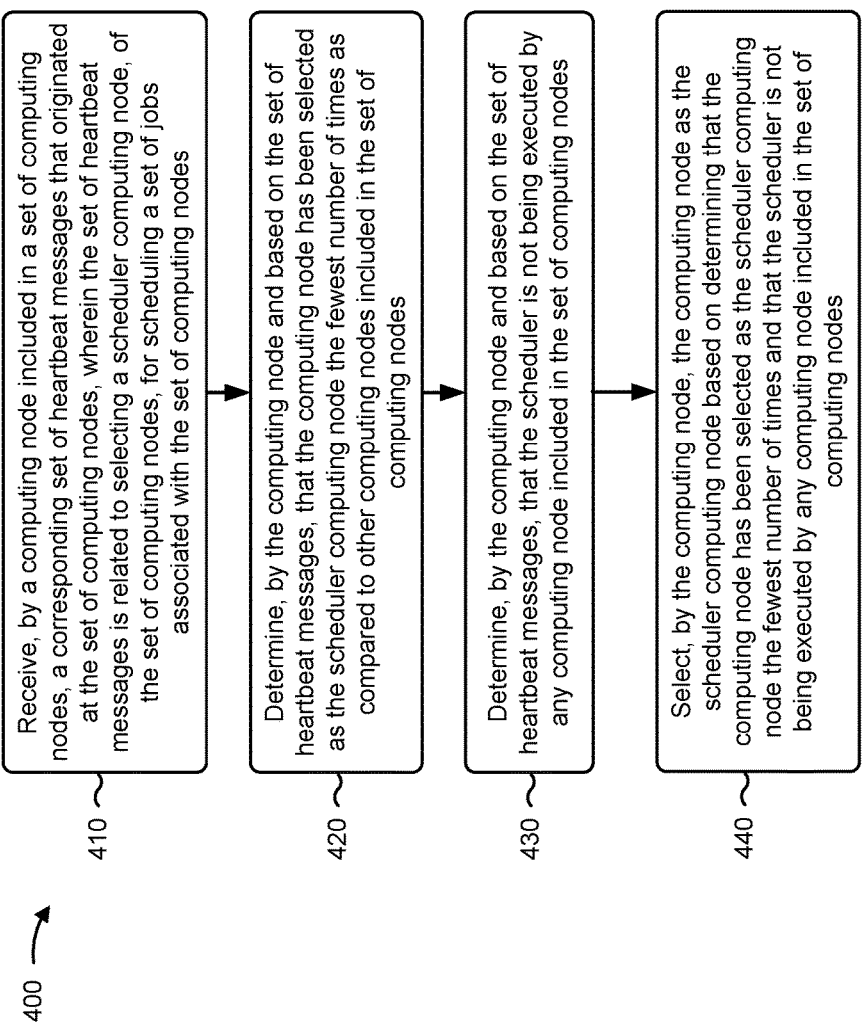

FIG. 4 is a flow chart of an example process 400 for computing node job assignment for distribution of scheduling operations. In some implementations, one or more process blocks of FIG. 4 may be performed by a computing node (e.g., computing node 220 and/or the like). In some implementations, one or more process blocks of FIG. 4 may be performed by another device or a group of devices separate from or including the computing node.

As shown in FIG. 4, process 400 may include receiving, by a computing node included in a set of computing nodes, a corresponding set of heartbeat messages that originated at the set of computing nodes, wherein the set of heartbeat messages is related to selecting a scheduler computing node, of the set of computing nodes, for scheduling a set of jobs associated with the set of computing nodes (block 410). For example, the computing node (e.g., using processor 320, memory 330, communication interface 370, and/or the like) may receive a set of heartbeat messages that originated at the set of computing nodes, as described above. In some implementations, the set of heartbeat messages is related to selecting a scheduler computing node, of the set of computing nodes, for scheduling a set of jobs associated with the set of computing nodes. In some implementations, each heartbeat message indicates, for a corresponding computing node of the set of computing nodes, a number of times that the corresponding computing node has been selected as the scheduler computing node, and whether the corresponding computing node is currently executing a scheduler to schedule one or more jobs for the set of computing nodes.

As further shown in FIG. 4, process 400 may include determining, by the computing node and based on the set of heartbeat messages, that the computing node has been selected as the scheduler computing node the fewest number of times as compared to other computing nodes included in the set of computing nodes (block 420). For example, the computing node (e.g., using processor 320, memory 330, communication interface 370, and/or the like) may determine, based on the set of heartbeat messages, that the computing node has been selected as the scheduler computing node the fewest number of times as compared to other computing nodes included in the set of computing nodes, as described above.

As further shown in FIG. 4, process 400 may include determining, by the computing node and based on the set of heartbeat messages, that the scheduler is not being executed by any computing node included in the set of computing nodes (block 430). For example, the computing node (e.g., using processor 320, memory 330, communication interface 370, and/or the like) may determine, based on the set of heartbeat messages, that the scheduler is not being executed by any computing node included in the set of computing nodes, as described above.

As further shown in FIG. 4, process 400 may include selecting, by the computing node, the computing node as the scheduler computing node based on determining that the computing node has been selected as the scheduler computing node the fewest number of times and that the scheduler is not being executed by any computing node included in the set of computing nodes (block 440). For example, the computing node (e.g., using processor 320, memory 330, communication interface 370, and/or the like) may select the computing node as the scheduler computing node based on determining that the computing node has been selected as the scheduler computing node the fewest number of times and that the scheduler is not being executed by any computing node included in the set of computing nodes, as described above.

Process 400 may include additional aspects, such as any single aspect or any combination of aspects described below and/or in connection with one or more other processes described elsewhere herein.

In some implementations, process 400 includes determining that the computing node is tied with one or more other computing nodes, included in the set of computing nodes, that have also been selected as the scheduler computing node the fewest number of times; and determining that an identifier of the computing node satisfies a condition. In some implementations, selecting the computing node as the scheduler includes selecting the computing node as the scheduler based on determining that the computing node is tied with the one or more other computing nodes and that the identifier of the computing node satisfies the condition. In some implementations, the identifier of the computing node is indicated in a heartbeat message, of the set of heartbeat messages, corresponding to the computing node. In some implementations, the condition includes the identifier of the computing node having a smallest value as compared to one or more identifiers corresponding to the one or more other computing nodes, or the identifier of the computing node having a largest value as compared to one or more identifiers corresponding to the one or more other computing nodes.

In some implementations, process 400 includes incrementing a value that indicates a number of times that the computing node has been selected as the scheduler computing node based on selecting the computing node as the scheduler computing node, and indicating the incremented value in a subsequent heartbeat message transmitted by the computing node. In some implementations, process 400 includes determining whether the scheduler is executing at a time when a subsequent heartbeat message is being generated, and indicating, in the subsequent heartbeat message and to the set of computing nodes, whether the scheduler is executing based on determining whether the scheduler is executing at the time when the subsequent heartbeat message is being generated.

In some implementations, process 400 includes scheduling at least one job, of the set of jobs, for at least one computing node, of the set of computing nodes, based on selecting the computing node as the scheduler computing node. In some implementations, transmissions of the set of heartbeat messages are synchronized across the set of computing nodes according to a periodicity. In some implementations, the computing node is selected as the scheduler based on the periodicity.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
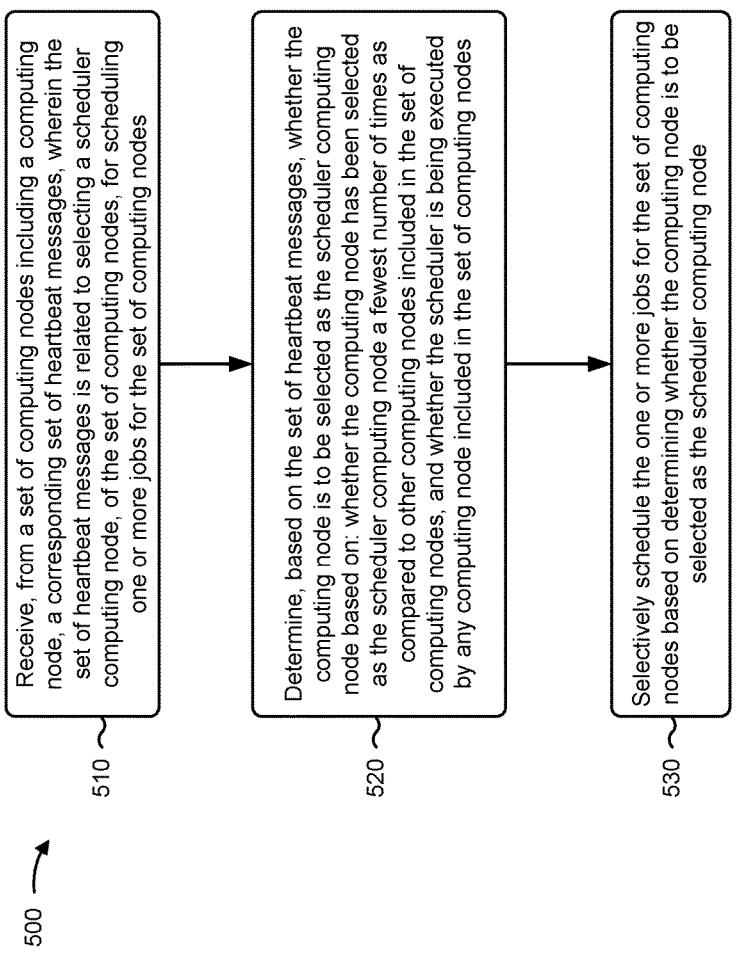

FIG. 5 is a flow chart of an example process 500 for computing node job assignment for distribution of scheduling operations. In some implementations, one or more process blocks of FIG. 5 may be performed by a computing node (e.g., computing node 220 and/or the like). In some implementations, one or more process blocks of FIG. 5 may be performed by another device or a group of devices separate from or including the computing node.

As shown in FIG. 5, process 500 may include receiving, from a set of computing nodes including a computing node, a corresponding set of heartbeat messages, wherein the set of heartbeat messages is related to selecting a scheduler computing node, of the set of computing nodes, for scheduling one or more jobs for the set of computing nodes (block 510). For example, the computing node (e.g., using processor 320, memory 330, communication interface 370, and/or the like) may receive, from a set of computing nodes including the computing node, a corresponding set of heartbeat messages, as described above. In some implementations, the set of heartbeat messages is related to selecting a scheduler computing node, of the set of computing nodes, for scheduling one or more jobs for the set of computing nodes. In some implementations, each heartbeat message indicates, for a corresponding computing node of the set of computing nodes, a number of times that the corresponding computing node has been selected as the scheduler computing node, and whether the corresponding computing node is currently executing a scheduler for the set of computing nodes.

As further shown in FIG. 5, process 500 may include determining, based on the set of heartbeat messages, whether the computing node is to be selected as the scheduler computing node based on: whether the computing node has been selected as the scheduler computing node a fewest number of times as compared to other computing nodes included in the set of computing nodes, and whether the scheduler is being executed by any computing node included in the set of computing nodes (block 520). For example, the computing node (e.g., using processor 320, memory 330, communication interface 370, and/or the like) may determine, based on the set of heartbeat messages, whether the computing node is to be selected as the scheduler computing node based on whether the computing node has been selected as the scheduler computing node a fewest number of times as compared to other computing nodes included in the set of computing nodes, and whether the scheduler is being executed by any computing node included in the set of computing nodes, as described above.

As further shown in FIG. 5, process 500 may include selectively scheduling the one or more jobs for the set of computing nodes based on determining whether the computing node is to be selected as the scheduler computing node (block 530). For example, the computing node (e.g., using processor 320, memory 330, communication interface 370, and/or the like) may selectively schedule the one or more jobs for the set of computing nodes based on determining whether the computing node is to be selected as the scheduler computing node, as described above.

Process 500 may include additional aspects, such as any single aspect or any combination of aspects described below and/or in connection with one or more other processes described elsewhere herein.

In some implementations, selectively scheduling the one or more jobs includes scheduling the one or more jobs based on determining that the computing node has been selected as the scheduler computing node the fewest number of times and that the scheduler is not being executed by any computing node included in the set of computing nodes, or refraining from scheduling the one or more jobs based on determining that the computing node has not been selected as the scheduler computing node the fewest number of times, or the scheduler is being executed.

In some implementations, a heartbeat message indicates, for the computing node, a unique identifier of the computing node. In some implementations, determining whether the computing node is to be selected as the scheduler computing node includes determining that the computing node is tied with one or more other computing nodes, included in the set of computing nodes, that have also been selected as the scheduler computing node the fewest number of times; determining, based on the set of heartbeat messages, whether the unique identifier of the computing node satisfies a condition in relation to one or more other unique identifiers corresponding to the one or more other computing nodes; and determining whether the computing node is to be selected as the scheduler computing node based on determining whether the unique identifier of the computing node satisfies the condition.

In some implementations, determining whether the computing node is to be selected as the scheduler computing node includes generating, based on the heartbeat messages, a sorted list of unique identifiers corresponding to the set of computing nodes, wherein the list is sorted based on values of the unique identifiers and a number of times that each computing node, in the set of computing nodes, has been selected as the scheduler computing node; and determining whether the computing node is to be selected as the scheduler computing node based on the sorted list.

In some implementations, process 500 includes storing the set of heartbeat messages in the one or more memories after receiving the set of heartbeat messages, and deleting the set of heartbeat message from the one or more memories after determining whether the computing node is to be selected as the scheduler computing node. In some implementations, process 500 includes determining a number of times that the computing node has been selected as the scheduler computing node; determining whether the scheduler is executing on the computing node at a time when a heartbeat message, of the set of heartbeat messages, is being generated by the computing node; and transmitting, in the heartbeat message, an indication of the number of times that the computing node has been selected as the scheduler computing node, and whether the scheduler is executing on the computing node.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for computing node job assignment for distribution of scheduling operations. In some implementations, one or more process blocks of FIG. 6 may be performed by a computing node (e.g., computing node 220 and/or the like). In some implementations, one or more process blocks of FIG. 6 may be performed by another device or a group of devices separate from or including the computing node.

As shown in FIG. 6, process 600 may include receiving, from a set of computing nodes including a computing node, a corresponding set of heartbeat messages, wherein the set of heartbeat messages is related to selecting a scheduler computing node, of the set of computing nodes, for scheduling one or more jobs for the set of computing nodes (block 610). For example, the computing node (e.g., using processor 320, memory 330, communication interface 370, and/or the like) may receive, from a set of computing nodes including the computing node, a corresponding set of heartbeat messages, as described above. In some implementations, the set of heartbeat messages is related to selecting a scheduler computing node, of the set of computing nodes, for scheduling one or more jobs for the set of computing nodes. In some implementations, each heartbeat message indicates, for a corresponding computing node of the set of computing nodes: a unique identifier that distinguishes the corresponding computing node from all other computing nodes included in the set of computing nodes, a number of times that the corresponding computing node has been selected as the scheduler computing node, and whether the corresponding computing node is currently selected as the scheduler computing node.

As further shown in FIG. 6, process 600 may include determining, based on the set of heartbeat messages, whether the computing node is to be selected as the scheduler computing node based on whether the computing node has been selected as the scheduler computing node a fewest number of times as compared to other computing nodes included in the set of computing nodes, and whether any computing node, of the set of computing nodes, is currently selected as the scheduler computing node (block 620). For example, the computing node (e.g., using processor 320, memory 330, communication interface 370, and/or the like) may determine, based on the set of heartbeat messages, whether the computing node is to be selected as the scheduler computing node based on whether the computing node has been selected as the scheduler computing node a fewest number of times as compared to other computing nodes included in the set of computing nodes, and whether any computing node, of the set of computing nodes, is currently selected as the scheduler computing node, as described above.

As further shown in FIG. 6, process 600 may include selectively scheduling the one or more jobs for the set of computing nodes based on determining whether the computing node is to be selected as the scheduler computing node (block 630). For example, the computing node (e.g., using processor 320, memory 330, communication interface 370, and/or the like) may selectively schedule the one or more jobs for the set of computing nodes based on determining whether the computing node is to be selected as the scheduler computing node, as described above.

Process 600 may include additional aspects, such as any single aspect or any combination of aspects described below and/or in connection with one or more other processes described elsewhere herein.

In some implementations, determining whether the computing node is to be selected as the scheduler computing node includes determining that the computing node is tied with one or more other computing nodes, included in the set of computing nodes, that have also been selected as the scheduler computing node the fewest number of times; determining, based on the set of heartbeat messages, whether a unique identifier of the computing node satisfies a condition in relation to one or more other unique identifiers corresponding to the one or more other computing nodes; and determining whether the computing node is to be selected as the scheduler computing node based on determining whether the unique identifier of the computing node satisfies the condition. In some implementations, the condition includes the unique identifier having a smallest value as compared to the one or more other unique identifiers, or the unique identifier having a largest value as compared to the one or more other unique identifiers.

In some implementations, determining whether the computing node is to be selected as the scheduler computing node includes generating, based on the set of heartbeat messages, a sorted list of unique identifiers corresponding to the set of computing nodes, wherein the list is sorted based on values of the unique identifiers and a number of times that each computing node, in the set of computing nodes, has been selected as the scheduler computing node; and determining whether the computing node is to be selected as the scheduler computing node based on the sorted list.

In some implementations, transmissions of the set of heartbeat messages occur according to a periodicity. In some implementations, the determination of whether the computing node is to be selected as the scheduler computing node is performed according to the periodicity.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like, depending on the context.

It will be apparent that systems and/or methods, described herein, may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a computing node included in a set of computing nodes, a corresponding set of heartbeat messages that originated at the set of computing nodes, wherein the set of heartbeat messages is related to selecting a scheduler computing node, of the set of computing nodes, for scheduling a set of jobs associated with the set of computing nodes,
   wherein each heartbeat message indicates, for a corresponding computing node of the set of computing nodes:
      a number of times that the corresponding computing node has been selected as the scheduler computing node, and
      whether the corresponding computing node is currently executing a scheduler to schedule one or more jobs for the set of computing nodes;
   determining, by the computing node and based on the set of heartbeat messages, that the computing node has been selected as the scheduler computing node the fewest number of times as compared to other computing nodes included in the set of computing nodes;
   determining, by the computing node and based on the set of heartbeat messages, that the scheduler is not being executed by any computing node included in the set of computing nodes; and
   selecting, by the computing node, the computing node as the scheduler computing node based on determining that the computing node has been selected as the scheduler computing node the fewest number of times and that the scheduler is not being executed by any computing node included in the set of computing nodes.

2. The method of claim 1, further comprising:
   determining that the computing node is tied with one or more other computing nodes, included in the set of computing nodes, that have also been selected as the scheduler computing node the fewest number of times;
   determining that an identifier of the computing node satisfies a condition; and
   wherein selecting the computing node as the scheduler comprises:
      selecting the computing node as the scheduler based on determining that the computing node is tied with the one or more other computing nodes and that the identifier of the computing node satisfies the condition.

3. The method of claim 2, wherein the identifier of the computing node is indicated in a heartbeat message, of the set of heartbeat messages, corresponding to the computing node.

4. The method of claim 2, wherein the condition includes:
   the identifier of the computing node having a smallest value as compared to one or more identifiers corresponding to the one or more other computing nodes, or
   the identifier of the computing node having a largest value as compared to one or more identifiers corresponding to the one or more other computing nodes.

5. The method of claim 1, further comprising:
   incrementing a value that indicates a number of times that the computing node has been selected as the scheduler computing node based on selecting the computing node as the scheduler computing node; and
   indicating the incremented value in a subsequent heartbeat message transmitted by the computing node.

6. The method of claim 1, further comprising:
   determining whether the scheduler is executing at a time when a subsequent heartbeat message is being generated; and
   indicating, in the subsequent heartbeat message and to the set of computing nodes, whether the scheduler is executing based on determining whether the scheduler is executing at the time when the subsequent heartbeat message is being generated.

7. The method of claim 1, further comprising scheduling at least one job, of the set of jobs, for at least one computing node, of the set of computing nodes, based on selecting the computing node as the scheduler computing node.

8. The method of claim 1, wherein transmissions of the set of heartbeat messages are synchronized across the set of computing nodes according to a periodicity, and wherein the computing node is selected as the scheduler based on the periodicity.

9. A computing node, comprising:
   one or more memories; and
   one or more processors, communicatively coupled to the one or more memories, configured to:
      receive, from a set of computing nodes including the computing node, a corresponding set of heartbeat messages,
         wherein the set of heartbeat messages is related to selecting a scheduler computing node, of the set of computing nodes, for scheduling one or more jobs for the set of computing nodes,
         wherein each heartbeat message indicates, for a corresponding computing node of the set of computing nodes:
            a number of times that the corresponding computing node has been selected as the scheduler computing node, and
            whether the corresponding computing node is currently executing a scheduler for the set of computing nodes;
      determine, based on the set of heartbeat messages, whether the computing node is to be selected as the scheduler computing node based on:
         whether the computing node has been selected as the scheduler computing node a fewest number of times as compared to other computing nodes included in the set of computing nodes, and
         whether the scheduler is being executed by any computing node included in the set of computing nodes; and
      selectively schedule the one or more jobs for the set of computing nodes based on determining whether the computing node is to be selected as the scheduler computing node.

10. The computing node of claim 9, wherein the one or more processors, when selectively scheduling the one or more jobs, are configured to:
   schedule the one or more jobs based on determining that the computing node has been selected as the scheduler computing node the fewest number of times and that the scheduler is not being executed by any computing node included in the set of computing nodes, or refrain from scheduling the one or more jobs based on
determining that:
the computing node has not been selected as the
scheduler computing node the fewest number of
times, or
the scheduler is being executed.

11. The computing node of claim 9, wherein a heartbeat message indicates, for the computing node, a unique identifier of the computing node.

12. The computing node of claim 11, wherein the one or more processors, when determining whether the computing node is to be selected as the scheduler computing node, are configured to:
determine that the computing node is tied with one or more other computing nodes, included in the set of computing nodes, that have also been selected as the scheduler computing node the fewest number of times;
determine, based on the set of heartbeat messages, whether the unique identifier of the computing node satisfies a condition in relation to one or more other unique identifiers corresponding to the one or more other computing nodes; and
determine whether the computing node is to be selected as the scheduler computing node based on determining whether the unique identifier of the computing node satisfies the condition.

13. The computing node of claim 11, wherein the one or more processors, when determining whether the computing node is to be selected as the scheduler computing node, are configured to:
generate, based on the heartbeat messages, a sorted list of unique identifiers corresponding to the set of computing nodes, wherein the list is sorted based on values of the unique identifiers and a number of times that each computing node, in the set of computing nodes, has been selected as the scheduler computing node; and
determine whether the computing node is to be selected as the scheduler computing node based on the sorted list.

14. The computing node of claim 9, wherein the one or more processors are further configured to:
store the set of heartbeat messages in the one or more memories after receiving the set of heartbeat messages; and
delete the set of heartbeat message from the one or more memories after determining whether the computing node is to be selected as the scheduler computing node.

15. The computing node of claim 9, wherein the one or more processors are further configured to:
determine a number of times that the computing node has been selected as the scheduler computing node;
determine whether the scheduler is executing on the computing node at a time when a heartbeat message, of the set of heartbeat messages, is being generated by the computing node; and
transmit, in the heartbeat message, an indication of:
the number of times that the computing node has been selected as the scheduler computing node, and
whether the scheduler is executing on the computing node.

16. A non-transitory computer-readable medium storing instructions, the instructions comprising:
one or more instructions that, when executed by one or more processors of a computing node, cause the one or more processors to:
receive, from a set of computing nodes including the computing node, a corresponding set of heartbeat messages,
wherein the set of heartbeat messages is related to selecting a scheduler computing node, of the set of computing nodes, for scheduling one or more jobs for the set of computing nodes,
wherein each heartbeat message indicates, for a corresponding computing node of the set of computing nodes:
a unique identifier that distinguishes the corresponding computing node from all other computing nodes included in the set of computing nodes,
a number of times that the corresponding computing node has been selected as the scheduler computing node, and
whether the corresponding computing node is currently selected as the scheduler computing node;
determine, based on the set of heartbeat messages, whether the computing node is to be selected as the scheduler computing node based on:
whether the computing node has been selected as the scheduler computing node a fewest number of times as compared to other computing nodes included in the set of computing nodes, and
whether any computing node, of the set of computing nodes, is currently selected as the scheduler computing node; and
selectively schedule the one or more jobs for the set of computing nodes based on determining whether the computing node is to be selected as the scheduler computing node.

17. The non-transitory computer-readable medium of claim 16, wherein the one or more instructions, that cause the one or more processors to determine whether the computing node is to be selected as the scheduler computing node, further cause the one or more processors to:
determine that the computing node is tied with one or more other computing nodes, included in the set of computing nodes, that have also been selected as the scheduler computing node the fewest number of times;
determine, based on the set of heartbeat messages, whether a unique identifier of the computing node satisfies a condition in relation to one or more other unique identifiers corresponding to the one or more other computing nodes; and
determine whether the computing node is to be selected as the scheduler computing node based on determining whether the unique identifier of the computing node satisfies the condition.

18. The non-transitory computer-readable medium of claim 17, wherein the condition includes:
the unique identifier having a smallest value as compared to the one or more other unique identifiers, or
the unique identifier having a largest value as compared to the one or more other unique identifiers.

19. The non-transitory computer-readable medium of claim 16, wherein the one or more instructions, that cause the one or more processors to determine whether the computing node is to be selected as the scheduler computing node, further cause the one or more processors to:
generate, based on the set of heartbeat messages, a sorted list of unique identifiers corresponding to the set of computing nodes, wherein the list is sorted based on values of the unique identifiers and a number of times that each computing node, in the set of computing nodes, has been selected as the scheduler computing node; and determine whether the computing node is to be selected as the scheduler computing node based on the sorted list.

20. The non-transitory computer-readable medium of claim 16, wherein transmissions of the set of heartbeat messages occur according to a periodicity, and wherein the determination of whether the computing node is to be selected as the scheduler computing node is performed according to the periodicity.

\* \* \* \* \*